United States Patent [19]
Geberth, Jr.

[11] 4,269,355
[45] May 26, 1981

[54] SELF-CLEANING SPRAY NOZZLE

[76] Inventor: John D. Geberth, Jr., Rifle Camp Rd., West Paterson, N.J. 07424

[21] Appl. No.: 21,499

[22] Filed: Mar. 19, 1979

[51] Int. Cl.³ .......................... B05B 15/02; B05B 1/32
[52] U.S. Cl. ...................................... 239/107; 239/455
[58] Field of Search .................... 239/104–107, 239/114–118, 451, 455, 585, 586; 137/328

[56] References Cited

U.S. PATENT DOCUMENTS

| | | |
|---|---|---|
| 453,918 | 6/1891 | Ruff ........................................ 239/108 |
| 1,143,293 | 6/1915 | Luehrs ................................... 239/108 |
| 2,793,628 | 5/1957 | Floyd ............................... 239/585 X |
| 2,968,919 | 1/1961 | Hughes et al. ................... 239/586 X |
| 3,936,002 | 2/1976 | Geberth, Jr. ..................... 239/586 X |
| 4,126,272 | 11/1978 | Geberth, Jr. ......................... 239/455 |

Primary Examiner—Andres Kashnikow
Attorney, Agent, or Firm—Joseph J. Orlando

[57] ABSTRACT

A self-cleaning spray nozzle or tip is provided for spray guns and like devices which are adapted to hydraulically atomize and spray liquids such as paint. The spray nozzle includes a valve stem in the spray opening and forming a part thereof which is abruptly and momentarily retractable to thereby fully open the spray opening to allow the dislodgement of any particles in the opening.

3 Claims, 4 Drawing Figures

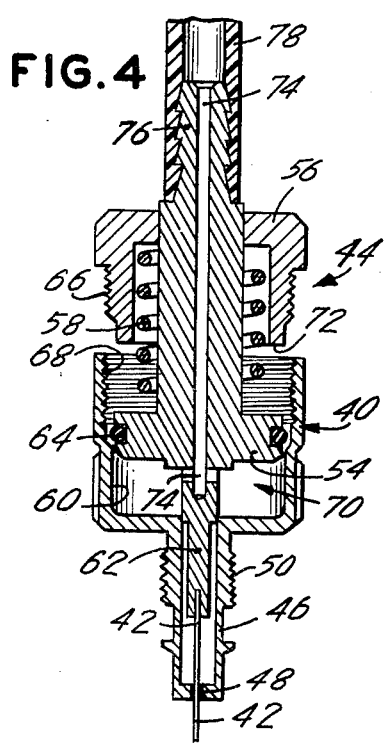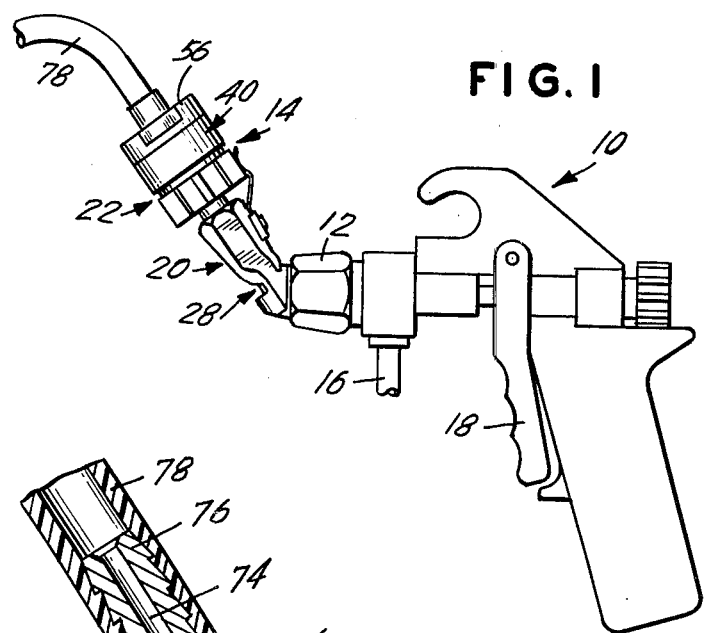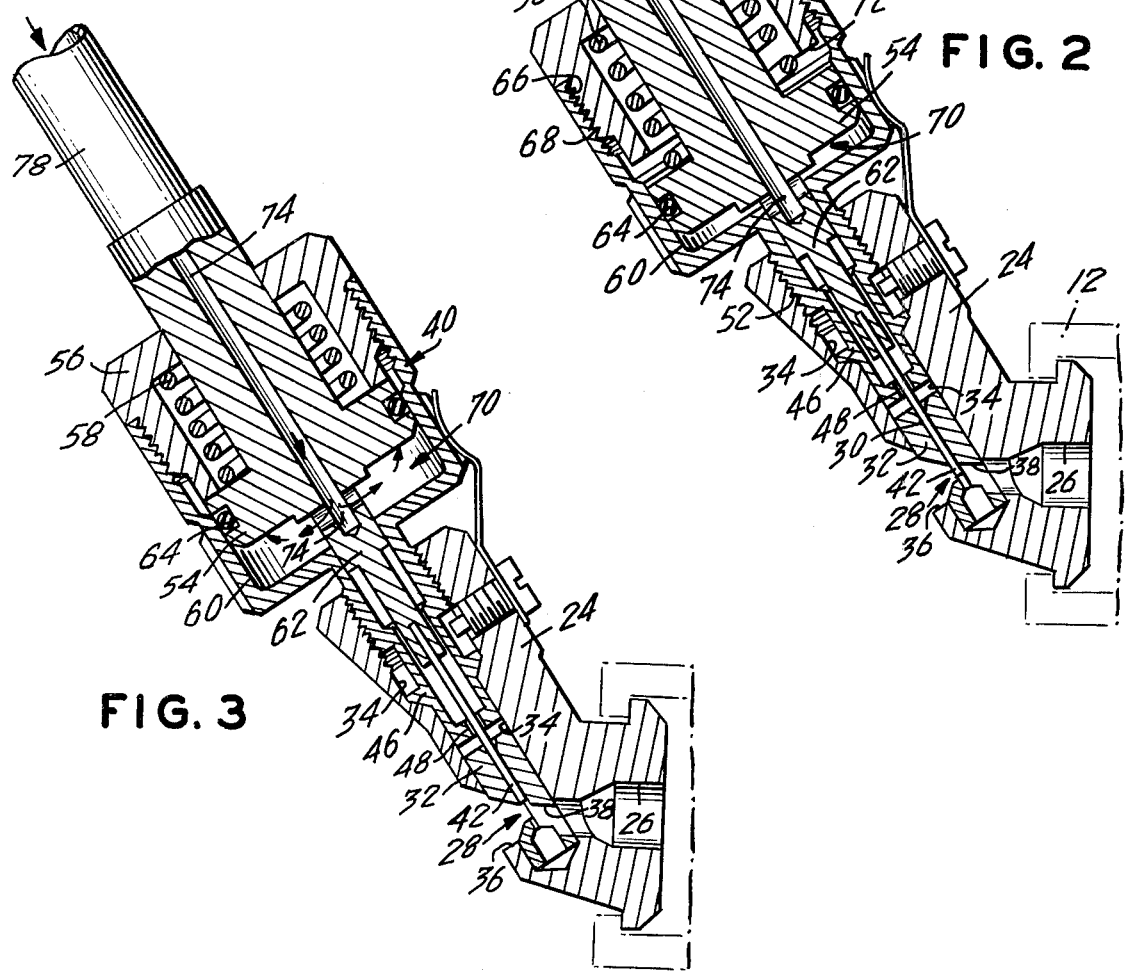

SELF-CLEANING SPRAY NOZZLE

The present invention relates generally to spray guns and like devices for hydraulically atomizing and spraying liquids such as paint or other liquid materials and, more particularly, it relates to such a device having a novel and improved spray nozzle which includes a means for self-cleaning of the nozzle orifice of lodged particles therein.

One of the systems of paint spraying in use today is termed the airless or hydraulic system. This system utilizes high pressure to force paint through a nozzle orifice causing the liquid paint to atomize to an extent suitable for paint spraying. It is essential for the proper operation of such a system that the nozzle orifice be of a very small cross sectional area in order to cause suitable atomization of the paint. Since the nozzle orifice is of such a small dimension, which may range from an effective diameter of 0.009 inches to an effective diameter of 0.060 inches depending on the spray desired or paint or other material used, it is highly susceptible to being clogged with particles in the paint. In order to unclog or clean a conventional airless nozzle, it is necessary to remove the nozzle from the spray gun and immerse it in a solvent, otherwise the operator must utilize a sharp instrument to dislodge the clogging particle, an operation which can be dangerous and certainly damaging to some degree to the precision nozzle opening.

There have been several attempts to alleviate the problem of cleaning nozzles in the past, however, each solution has had its drawbacks. One solution utilizes a spray nozzle wherein the portion of the nozzle having the spray orifice is reversed to the fluid flow allowing the fluid pressure to push the clogging matter out the reverse side of the nozzle. Examples of such devices are contained in U.S. Pat. No. 3,414,196, to Legeze et. al., granted Dec. 3, 1968, and U.S. Pat. No. 3,667,681, to Blancha, granted June 2, 1972. An obvious problem with such devices is that painting must be discontinued while the operator reverses the nozzle. Also, in order not to flood the surface being painted and thereby causing a blemish thereon because of the lack of atomization of the paint passing through the reversed nozzle, it is necessary to re-aim or deflect the stream of paint during the unclogging procedure.

Another solution, invented by the applicant herein and disclosed in U.S. Pat. No. 3,936,002, granted Feb. 3, 1976, allows the operator to adjust the opening of the nozzle orifice making it larger and thereby allowing the clogging matter to be pushed through the expanded opening by means of the pressure of the liquid. In accordance with this patent, a spray nozzle is provided having a fluid bore communicating with a source of pressurized liquid and terminating in a nozzle opening. A valve bore, adjacent to and substantially transverse to the nozzle opening, is also provided and which has a moveable valve stem therein. Movement of the valve stem by means of an adjustment knob allows the operator to vary the size of the spray opening and thereby adjust the spray of liquid from the spray opening. This mechanism also permits the operator, when clogging occurs, to increase the size of the spray opening, thereby allowing the liquid pressure to push out and dislodge the clogging matter. However, in order to accomplish this unclogging, the operator must manually move the valve stem by means of the adjustment knob and before he can begin painting again he must readjust the valve stem to its previous position.

It is, therefore, a primary object of the present invention to provide a spray nozzle or tip for a spray gun or similar device, adapted to hydraulically atomize and spray liquids such as paint, or other liquid materials, wherein the nozzle orifice is self-clearing of lodged or clogging matter therein.

The above object, as well as others which will hereinafter become apparent, is accomplished in accordance with the present invention by the provision of a spray nozzle having a valve stem adjacent to and substantially transverse of the nozzle orifice and forming a part thereof. The valve stem may be momentarily and abruptly retracted to thereby fully open the nozzle orifice and allow the dislodgement of any clogging matter in the orifice by means of the force provided by the pressurized liquid.

The present invention will be described and understood more readily when considered together with the accompanying drawing, in which:

FIG. 1 is a side elevational view of a hydraulic spray gun having attached thereto a spray tip according to the present invention;

FIG. 2 is an enlarged cross-sectional view of the spray tip according to the present invention;

FIG. 3 is an enlarged cross-sectional view of the spray tip according to the present invention during the self-cleaning operation; and FIG. 4 is an enlarged cross-sectional view of the self-cleaning mechanism of the spray tip.

Referring now to the drawings, there is shown in FIG. 1 a spray gun, generally designated 10, adapted for hydraulically atomizing and spraying liquids such as paint or other liquid materials. Spray gun 10 has attached thereto, by means of retaining nut 12, a spray tip, generally designated 14. It is to be appreciated that spray tip 14 may be utilized with spraying devices other than spray guns, automatic spraying devices for instance, but for the sake of simplicity, the present description will be confined to spray guns. Fluid conduit 16 supplies high pressure liquid to spray gun 10 from a liquid reservoir (not shown) maintained under high pressure. An actuating valve (not shown), housed within spray gun 10 and activated by trigger mechanism 18, causes the high pressure liquid to be delivered to spray tip 14.

Spray tip 14 of the present invention basically includes a spraying mechanism, generally designated 20, and a nozzle self-cleaning mechanism, generally designated 22. Spray mechanism 20, as clearly seen in FIG. 2, includes a spray tip housing, generally designed 24, having a tapered fluid bore 26 therein which communicates with the high pressure liquid supplied to spray gun 10. Fluid bore 26 terminates in nozzle orifice 28 through which the high pressure liquid passes and is caused to atomize thereby forming a spray suitable for painting or other coating applications. Adjacent nozzle orifice 28 and substantially transverse thereto a valve bore, generally designated 30, is provided. Although valve bore 30 and nozzle orifice 28 may be formed in housing 24, it has been found that since these areas are subject to great erosive forces it is better to provide a tungsten carbide, or similar erosion-resistant material insert, generally designated 32. Insert 32 is fitted into bore 34 formed in housing 24 such that nozzle orifice 28 is aligned with opening 36 in housing 24 and opening 38, formed in insert 32 opposite nozzle orifice 28, is aligned with fluid bore 26 in housing 24.

The nozzle self-cleaning mechanism 22, as clearly seen in FIG. 4, includes an assembly housing, generally designated 40, a retractable valve stem, designated 42, and means 44 for retractably moving valve stem 42. Assembly housing 40, which houses valve stem retracting means 44 and valve stem 42, is provided with a barrel 46 which is insertable into bore 34 of spray tip housing 24. At the end of barrell 46 an opening, designated 48, is provided through which valve stem 42 protrudes and which in turn is insertable into valve bore 30. Once in position within valve bore 30, valve stem 42 forms part of nozzle orifice 28 and for this reason at least the end of stem 42 must be formed of an erosion-resistant material such as tungsten carbide. Although valve stem 42 may be fixed in a particular position within nozzle orifice 28 and thus give a particular fan spray, the spray tip depicted in the drawings is an adjustable spray tip. Thus, barrel 46 is provided with a threaded portion 50 which is threadably engaded by female threaded portion 52 within bore 34 of housing 24. By turning assembly housing 40, valve stem 42 may be moved within valve bore 30 to open or close nozzle orifice 28 and thus adjust the fan spray issuing therefrom. This mechanism is the subject of my earlier U.S. Pat. No. 3,936,002 referred to hereinabove.

Valve stem retracting means 44 includes a piston, generally designated 54, a retainer, designated 56, and a spring 58. Piston 54 is adapted for sliding movement in a cylinder, designated 60, in assembly housing 40 and has secured thereto the shank 62 of valve stem 42. A seal, designated 64, which may be a rubber "O" ring, provides a seal between pistons 54 and the side walls of cylinder 60. Retainer 56 may be threadably engaged with assembly housing 40 by means of male threaded portion 66 on retainer 56 and female threaded portion 68 in assembly housing 40. Spring 58 is thus compressed between retainer 56 and piston 54 to provide sufficient pressure against piston 54 to maintain valve stem 42 in its fully extended position. For the purpose of retracting valve stem 42, compressed air is permitted to enter chamber 70, defined by piston 54 and cylinder 60, to thereby overcome the pressure of spring 58 and move piston 54 relative to cylinder 60 thus retracting valve stem 42. A shoulder, designated 72, on retainer 56 serves to limit the travel of piston 54 such that valve stem 42 is retracted only so much as is necessary to fully open the nozzle orifice. The compressed air may be introduced into chamber 70 via a bore, generally designated 74, in piston 54 which communicates with chamber 70 and which is provided with a hose fitting 76. An air hose, designated 78, connected to hose fitting 76 delivers the compressed air from a source (not shown) to spray tip 14. It is to be understood that only one means for retracting valve 42 has been described and that there are other means suitable for this purpose, such as an electronically or electrically activated solenoid wherein valve stem 42 forms the moveable core thereof.

In operation, a liquid coating material under high pressure is delivered to spray tip 14 via spray gun 10 and exits from the spray tip through nozzle orifice 28 in the form of a fan spray. In the event orifice 28 is clogged by large particles in the coating material and spraying is thereby interrupted, the operator merely has to provide a momentary blast of compressed air to valve stem retracting means 44 to thereby momentarily and abruptly retract valve stem 42, as clearly seen in FIG. 3, and fully open orifice 28. Once orifice 28 is fully open, the fluid pressure will dislodge any clogging matter in the orifice and the operator can then allow the valve stem 42 to return to its normal position and continue painting. For this purpose a suitable air valve (not shown) may be provided in air hose 78 which may be controlled easily by the operator. Also, it is possible to provide a flow sensor to detect movement of the fluid coating material and when this ceases, as is the case when the orifice is clogged, a suitable control mechanism can automatically cause the compressed air to be momentarily delivered to the valve stem retracting means 44 to thereby clear the orifice. As clearly seen in FIG. 3, the compressed air enters chamber 70 via hose 78, hose fitting 76, and bore 74 and is sufficient to overcome the pressure provided by spring 58. By overcoming the pressure of spring 58, piston 54 is moved within cylinder 60 and valve stem 42 is retracted. Piston 54 is stopped in its movement by shoulder 72 on retainer 56 such that valve stem 42 is allowed to move only enough to fully open nozzle orifice 28.

It is to be understood that the foregoing general and detailed descriptions are explanatory of the present invention and are not to be interpreted as restrictive of the scope of the following claims.

What is claimed is:

1. A self-cleaning spray nozzle for use with a spray device adapted for hydraulically atomizing and spraying liquids, said spray device including conduit means communicating with a source of liquid under pressure, said spray nozzle including:
   (a) a spray nozzle housing including means for securing said housing to said spray device;
   (b) a fluid bore in said housing communicating with said conduit means and terminating in a spray opening in said housing;
   (c) a valve bore in said housing intersecting said fluid bore adjacent said spray opening;
   (d) a valve stem in said valve bore the end of which forms part of said spray opening;
   (e) means for adjustably moving said valve stem in said valve bore to vary said spray opening to thereby vary the fan spray issuing therefrom; and
   (f) means, in addition to the means for adjustably moving said valve stem, for abruptly retracting said valve stem in said valve bore to abruptly open said spray opening to its fullest extent to thereby permit the dislodgement of matter clogging the spray opening by means of the pressure of said liquid.

2. The self-cleaning spray nozzle of claim 1 wherein the means for abruptly retracting said valve stem comprises:
   (a) a cylinder secured to said spray nozzle housing;
   (b) a moveable piston in said cylinder, said piston being secured to said valve stem; and
   (c) means for introducing compressed gas into said cylinder to thereby move said piston and retract said valve stem.

3. The self-cleaning spray nozzle of claim 2 wherein the means for abruptly retracting said valve stem further includes means biasing said valve stem to its unretracted position in said valve bore.

* * * * *